United States Patent [19]

Norén

[11] Patent Number: 5,251,850
[45] Date of Patent: Oct. 12, 1993

[54] DEVICE FOR ADJUSTMENT OF THE HEIGHT OF AN AIRSHIP

[75] Inventor: Torsten A. B. Norén, Hägersten, Sweden

[73] Assignee: Bruno Wintzell, Stockholm, Sweden

[21] Appl. No.: 741,410

[22] PCT Filed: Feb. 16, 1989

[86] PCT No.: PCT/SE89/00068

§ 371 Date: Sep. 17, 1991

§ 102(e) Date: Sep. 17, 1991

[87] PCT Pub. No.: WO90/09312

PCT Pub. Date: Aug. 23, 1990

[51] Int. Cl.[5] .......................... B64B 1/58; B64B 1/60
[52] U.S. Cl. ........................................ 244/128; 244/30
[58] Field of Search ................ 244/128, 96, 97, 98, 244/30

[56] References Cited

U.S. PATENT DOCUMENTS

| 1,577,756 | 3/1926 | Reagan . | |
|---|---|---|---|
| 1,631,895 | 6/1927 | Siller | 244/128 |
| 1,648,935 | 11/1927 | Campau . | |
| 1,682,405 | 8/1928 | Naatz . | |
| 1,853,376 | 4/1932 | Powelson et al. . | |
| 3,488,019 | 1/1970 | Sonstegaard | 244/128 |
| 4,012,016 | 3/1977 | Davenport | 244/128 |
| 4,773,617 | 9/1988 | McCampbell . | |

FOREIGN PATENT DOCUMENTS

| 265517 | 10/1913 | Fed. Rep. of Germany | 244/128 |
|---|---|---|---|
| 274332 | 5/1914 | Fed. Rep. of Germany | 244/128 |
| 86098 | 4/1936 | Fed. Rep. of Germany | 244/128 |
| 3634101 | 4/1988 | Fed. Rep. of Germany | 244/128 |
| 402479 | 10/1909 | France | 244/128 |
| 46376 | 6/1936 | France | 244/128 |
| 2318783 | 2/1977 | France . | |
| 301793 | 10/1932 | Italy | 244/128 |
| 82068263 | 11/1982 | Sweden . | |
| 87032389 | 8/1987 | Sweden . | |

Primary Examiner—Joseph F. Peters, Jr.
Assistant Examiner—Virna Lissi Ansley
Attorney, Agent, or Firm—Cushman, Darby & Cushman

[57] ABSTRACT

An apparatus for regulating the height of an airship, which includes a floating body of tube-like supporting gas containers and air bags. The air bags are disposed outside and between the supporting gas containers and connect the containers to each other. The apparatus includes at least one fan-compressor for high pressure and/or at least one fan-compressor for low pressure.

8 Claims, 1 Drawing Sheet

DEVICE FOR ADJUSTMENT OF THE HEIGHT OF AN AIRSHIP

BACKGROUND OF THE INVENTION

The present invention relates to airships, and in particular to apparatus for adjusting the height of an airship, the apparatus including a floating body of tube-like supporting gas containers and air bags.

In airships known up until now, the supporting body comprises one or more tube-like supporting gas containers and air bags arranged inside each container. When several containers are used they are not interconnected, but are mutually free. Air is supplied via air lines for filling the bags. In the present state of the art, for internal air bags, only local variations in air pressure, temperature, etc., can be compensated for, i.e. neither fuel, nor load (i.e. available load), which are usually compensated for by sandbags or the like can be compensated for without use of such means.

SUMMARY OF THE INVENTION

The object of the invention is thus to provide a floating body with a relationship between strength and weight such that trimming required by air pressure and temperature can be carried out and the available load can be compensated within the capacity of known materials.

This object is attained with the apparatus in accordance with the present invention, which is distinguished in that the air bags are disposed outside of and between the supporting gas containers such as to join the latter to each other, and in that the apparatus includes at least one fan-compressor means for high pressure and/or at least one fan-compressor means for low pressure.

The apparatus is further distinguished in that each air bag contains one or more cells.

In a preferred embodiment of the apparatus, the floating body includes at least three supporting gas containers, defining by their air bags an interior space for supporting gas.

In another preferred embodiment of the apparatus, the floating body includes at least four supporting gas containers, and the interior space may include at least one further-air bag dividing the space into at least two smaller, longitudinal spaces. In addition, there can be envisaged six, seven, eight, etc., separated supporting gas containers.

BRIEF DESCRIPTION OF THE DRAWING

The invention will now be described in more detail below, and with reference to the accompanying drawing, wherein.

DETAILED DESCRIPTION

Figure 1:
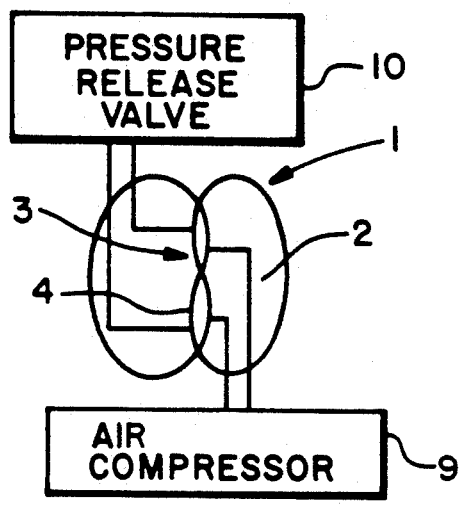
FIG. 1 is a vertical transverse cross-section through a first embodiment of the apparatus, the air bags not being filled with compressed air.
Figure 2:
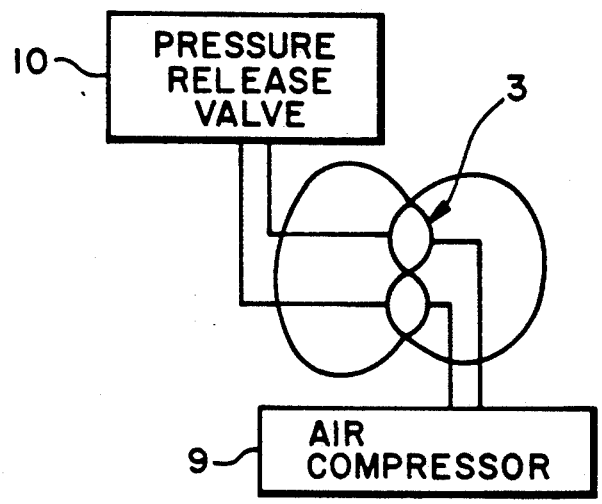
FIG. 2 illustrates the same arrangement as in FIG. 1, but with the air bags filled with compressed air.

As will be seen from FIGS. 1 and 2, the apparatus for adjusting the height of an airship in accordance with the invention is a floating body 1 which comprises a plurality of horizontally, longitudinally elongated supporting gas containers 2, arranged side-by-side and which become tube-shaped due to interior excess pressure, and a plurality of horizontally, longitudinally elongated air bags 3 arranged side-by-side relative to one another and relative to the supporting gas containers 2, which air bags 3 may be filled, for reducing the height of the airship, with copressed air from a fan compressor means 8 connected thereto, and for increasing height may be vented by valves 9 on the air bags. The supporting gas containers 2 and air bags 3 are made from a flexible but unstretchable material, and preferably of the same material. Due to the use of several smaller supporting gas containers instead of a large one, and air bags which are each divided into several cells 4, the assortment of woven fabrics available for them is widened, since less excess pressure is required. It is particularly emphasised that there is thus provided the opportunity of selecting a woven fabric of low weight, which, of course, considerably facilitates both manufacture and height adjustment. By the air bags 3 being disposed outside and between the supporting gas containers as well as connecting the latter to each other, there is also obtained the advantage that the total weight of the floating body may be increased or decreased, while simultaneously decreasing or increasing its supporting gas volume, resulting in more effective height adjustment than that obtained by supporting gas containers solely having internal air bags, where it is merely possible to increase or decrease the total weight.

Figure 3:
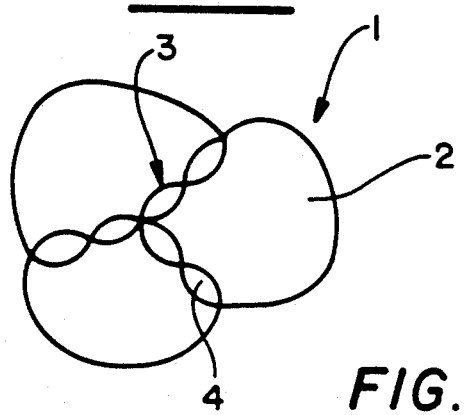
FIG. 3 schematically illustrates a second embodiment of the apparatus.
Figure 4:
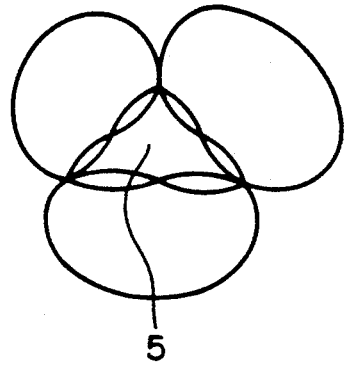
FIG. 4 schematically illustrates a third embodiment of the inventive apparatus, and FIG. 5 a fourth embodiment of the apparatus.

The second embodiment of the apparatus illustrated in FIG. 3 comprises three supporting gas containers 2, each having an air bag 3 meeting at a common point, the third embodiment of the apparatus illustrated in FIG. 4 and also having three containers 2 with their individual air bags is one where the containers 2 define an interior space 5, which may be filled with supporting gas, thus increasing the lifting capacity of the floating body.

Figure 5:
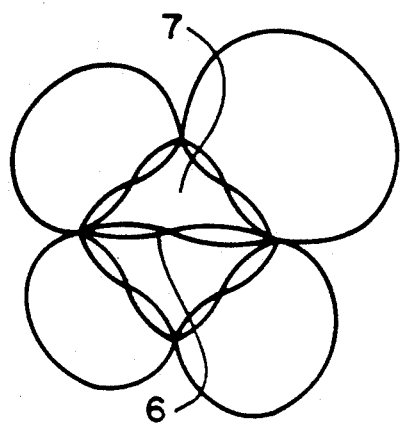

The fourth embodiment, illustrated in FIG. 5, of the apparatus comprises four supporting gas containers 2, each with an air bag 3 and defining an interior space 5, as with the apparatus of FIG. 4, and a further air bag 6 can be used to divide this space into two smaller, longitudinal spaces 7. Finally, one or more of the air bags 3 and 6 can be permanently filled with compressed air, in which case they serve as stiffening beams.

I claim:

1. An adjustable-height airship, comprising:
   a plurality of horizontally, longitudinally elongated, closed tubular containers for supporting gas, each having an inside and an outside said containers being arranged side-by-side;
   at least one horizontally, longitudinally elongated, closed tubular air bag disposed entirely outside each said tubular container, each said air bag having at least one cell;
   each said air bag being interposed laterally between a respective at least two of said containers and connecting such containers to one another; and
   compressed air generating means operatively connected with each said air bag for selectively internally pressurizing each said air bag to an above-atmospheric pressure, by pressurizing atmospheric air drawn from externally of said airship, and valve means operatively connected with each said air bag for releasing such air from each said air bag.

2. The adjustable-height airship of claim 1, wherein:

each said air bag is subdivided into at least two of said cells, at least one of which is selectively internally pressurizable using said compressed air generating means.

3. The adjustable-height airship of claim 2, wherein:
at least one said cell is permanently filled with compressed air and thereby functions as a stiffener for said airship.

4. The adjustable-height airship of claim 1, wherein:
there are at least two said air bags; and
said compressed air generating means is arranged to pressurize said air bags to at least three different pressures, respectively for trimming in response to local variations in pressure and temperature, for compensating for payload, and for compensating for fuel usage.

5. The adjustable-height airship of claim 1, wherein:
there are three said containers, arranged in three pairs of two.

6. The adjustable-height airship of claim 1, wherein:
there are three said containers, arranged as an annulus around said three air bags serially connected to one another in pairs at respective lateral edges so as to define a central space; said central space being closed and providing a fourth container for supporting gas.

7. The adjustable-height airship of claim 1, wherein:
there are four said containers, arranged as an annulus around four air bags serially connected to one another in pairs at respective lateral edges so as to define a central space; said central space and being subdivided by a further multiple cell air bag for compressed air, and closed for providing a fifth and a sixth container for supporting gas.

8. The adjustable-height airship of claim 1, wherein:
there are two said containers and one said air bag, having at least two said cells.

* * * * *